Patented Jan. 2, 1940

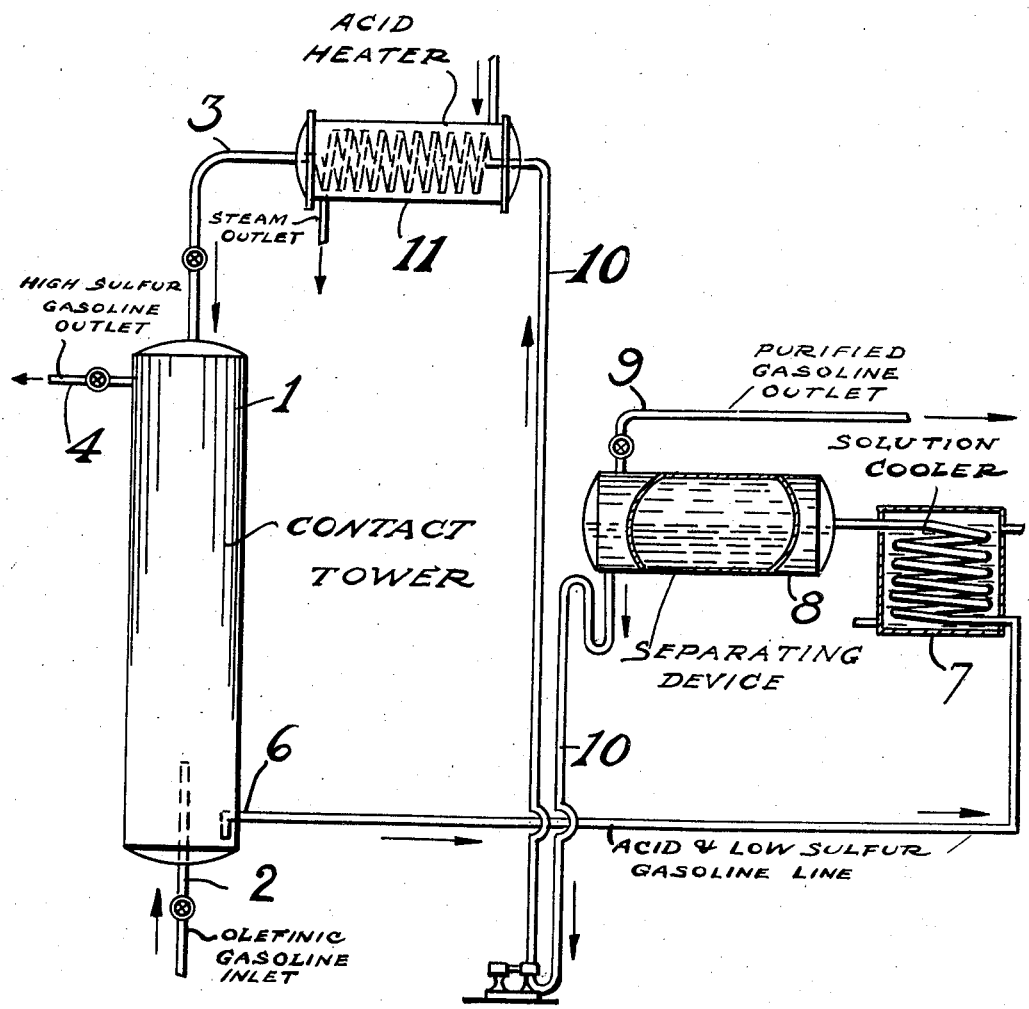

2,185,577

UNITED STATES PATENT OFFICE 2,185,577

DESULPHURIZATION OF GASOLINES

Alexis Voorhies, Jr., and Eldon E. Stahly, Baton Rouge, La., assignors to Standard Oil Development Company, a corporation of Delaware Application December 23, 1936, Serial No. 117,357

7 Claims. (Cl. 196—31)

The present invention relates to the desulphurization of olefinic gasolines, particularly to the type of gasoline which is obtained by the polymerization of normally gaseous olefins under conditions leading to the production of olefins of higher molecular weight. The process of the present invention is also applicable to olefinic gasolines produced by solvent extraction of cracked naphthas predominantly composed of olefins and naphthas produced by the catalytic dehydrogenation of straight run paraffinc naphthas.

According to the present invention, gasolines which are almost or entirely composed of olefins, and containing sulphur compounds, are desulphurized by being dissolved in hot sulphuric acid of a concentration ranging from about 45 to 75%. The sulphuric acid dissolves the olefin hydrocarbons to the exclusion of the sulphur compounds. The operation is conducted at a temperature above room temperature but below that at which the gasoline begins to vaporize. In general, the temperature of operation may be stated to be a temperature at which the olefinic hydrocarbons are miscible with sulphuric acid of the strength designated, and is usually between 150° F. and 250° F. In some cases, where temperatures near the upper end of the range are employed, it is desirable to operate under a sufficiently elevated pressure to prevent vaporization of the gasoline.

The process of the present invention may be better understood from the following description of the accompanying drawing in which is illustrated in diagrammatic form a front elevation of an apparatus suitable for carrying out said process. Referring to the drawing specifically, 1 is a contact tower which is preferably filled with lumps of inert material such as stoneware, porcelain, or carbon Raschig rings, and which is provided with a gasoline feed line 2, an acid feed line 3, a raffinate (which contains the sulphur compounds) outlet 4, and an extract (containing the purified gasoline) outlet 6.

The operation illustrated is a continuous operation in which the gasoline to be purified is passed countercurrent to the acid employed. The extract is conducted thru line 6 and thru a cooling coil 7 in which it is cooled to a point below the miscibility temperature of the gasoline and the sulphuric acid, and then to a settling chamber 8 in which it separates into two layers, the upper layer being the gasoline which is drawn off thru line 9 and the lower layer being the sulphuric acid which is drawn off thru line 10 and passed thru a heating coil 11 into inlet 3.

The separation of the gasoline from the acid may be facilitated by the addition of water to the extract. This procedure has the disadvantage, however, that it requires either a later concentration of the acid before the latter can be employed for another extraction or a change in the extraction conditions.

In a specific application of the process of the present invention a gasoline composed of polymerized butylenes and containing 0.4% of sulphur was contacted with 20 lbs./gal. of 60% sulphuric acid at a temperature of 225° F. The gasoline recovered from the sulphuric acid extract had a sulphur content of only 0.04%.

It is apparent that various changes may be made in the process described above without departing from the scope of the present invention. For example, the extraction operation may be conducted in stages in the manner known in the acid treating of gasoline as it is commonly practiced, or, if desired, the process may be conducted as a batch operation.

The process of the present invention may be employed with particular advantage as the first step in the desulphurization of and the improvement of the octane number of gasoline containing sulphur compounds, olefins, paraffins, and/or naphthenes. It is desirable to subject such gasolines to a so-called reforming treatment, preferably at a temperature ranging from about 800° F. to 1100° F. in the presence of a catalyst which may be ether a straight dehydrogenation catalyst or one which functions both as a dehydrogenation and a desulphurization catalyst. Bauxite, ferrous-sulphide, calcium sulphide, and the oxides and sulphides of metals of group VI of the periodic system, preferably in conjunction with alumina, may be mentioned as typical examples of suitable catalysts.

Such catalytic treatments proceed more smoothly when the feed stock is free from olefins. By applying the sulphuric acid extraction of the present invention to such a mixed feed it is possible to obtain a substantially sulphur-free olefin extract and a substantially olefin-free sulphur-containing raffinate as a feed stock for the catalytic treatment. The reaction product from the catalytic treatment may be further extracted with sulphuric acid and the raffinate of this second extraction recycled to the catalytic treatment or said product may be blended with the olefinic extract obtained in the first extraction.

The nature and objects of the present invention having been thus described and illustrated by a practical embodiment thereof, what is claimed as new and useful and desired to be secured by Letters Patent is:

1. A process for desulphurizing sulphur containing gasoline composed predominantly of olefinic polymers which comprises intimately mixing said gasoline with sulphuric acid of between about 45 and about 75% concentration and at a temperature sufficient to render a substantial part of said acid miscible with said polymers, separating the resulting mixture into a hydrocarbon layer containing more sulphur than said gasoline originally contained and a sulphuric acid layer containing hydrocarbon polymers and less of the sulphur compounds than said polymers originally contained, and recovering from said sulphuric acid layer a hydrocarbon mixture boiling within the gasoline range and having a reduced sulphur content.

2. A process as in claim 1 in which the hydrocarbon mixture boiling within the gasoline range and having a reduced sulphur content is recovered from the sulphuric acid layer by cooling the sulphuric acid layer to a temperature at which the olefins and the sulphuric acid are substantially immiscible.

3. A process for the desulphurization of sulphur-containing olefinic polymers boiling within the gasoline range which comprises intimately mixing said polymers with sulphuric acid of a strength ranging from about 45 to about 75% and at a temperature at which the hydrocarbon constituents of the polymer are substantially miscible with said sulphuric acid thereby forming a sulphuric acid extract containing olefinic polymer hydrocarbons and substantially less of the sulphur compounds than said hydrocarbons originally contained, separating said extract from undissolved high sulphur-containing hydrocarbon constituents, cooling said extract to a temperature at which the hydrocarbon polymers are substantially immiscible with the sulphuric acid and recovering desulphurized polymers boiling within the gasoline range by separating the hydrocarbon layer from the sulphuric acid layer.

4. A process according to claim 1 in which said sulphur-containing gasoline is composed of polymerized butylenes, said polymers being obtained by means of the action of sulphuric acid on butylenes under polymerizing conditions.

5. A process for producing a substantially sulphur-free olefinic polymer gasoline from a gasoline comprising essentially olefinic polymers but containing a small amount of sulphur compounds which comprises intimately mixing said gasoline with sulphuric acid of a strength ranging from about 45% to about 75% at a temperature from about 150° F. to about 250° F., separating the undissolved hydrocarbons and sulphur compounds from the sulphuric acid extract, recovering the dissolved olefinic polymer gasoline substantially free of sulphur compounds from the sulphuric acid extract by cooling said extract to a temperature at which the olefinic polymer gasoline is substantially immiscible with the sulphuric acid and removing the hydrocarbon layer from the sulphuric acid layer.

6. A process of desulphurizing a mixture of hydrocarbons boiling within the gasoline range containing sulphur and composed chiefly of polymerized normally gaseous mono-olefins which comprises intimately mixing with said mixture sulphuric acid of a concentration between about 45 and about 75% at a temperature of between about 150 and about 250° F., separating the hot acid layer from the hydrocarbon layer, allowing the acid layer mixture to cool below the miscibility temperature of the sulphuric acid and polymeric gasoline, and separating the purified olefinic polymer boiling within the gasoline boiling range from the acid.

7. A process as in claim 1 wherein the sulphuric acid separated from the purified olefinic polymer hydrocarbon mixture is reheated to the treating temperature and recycled and contacted with fresh sulphur-containing polymeric gasoline countercurrently.

ALEXIS VOORHIES, Jr.
ELDON E. STAHLY.